(12) United States Patent
Dhurandhar et al.

(10) Patent No.: US 10,467,631 B2
(45) Date of Patent: Nov. 5, 2019

(54) RANKING AND TRACKING SUSPICIOUS PROCUREMENT ENTITIES

(71) Applicant: International Business Machines Corporation, Armonk, NY (US)

(72) Inventors: Amit Dhurandhar, Yorktown Heights, NY (US); Markus Ettl, Ossining, NY (US); Bruce C. Graves, Briarcliff Manor, NY (US); Gopikrishna Maniachari, Croton on Hudson, NY (US); Anthony T. Mazzatti, Johnson City, NY (US); Rajesh Kumar Ravi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 15/094,361

(22) Filed: Apr. 8, 2016

(65) Prior Publication Data

US 2017/0293917 A1 Oct. 12, 2017

(51) Int. Cl.
*G06Q 30/00* (2012.01)
*G06Q 20/40* (2012.01)
(Continued)

(52) U.S. Cl.
CPC ......... *G06Q 30/0185* (2013.01); *G06N 7/005* (2013.01); *G06Q 20/4016* (2013.01); *G06Q 30/04* (2013.01)

(58) Field of Classification Search
USPC .................. 705/7.28, 26.35, 34; 235/380
See application file for complete search history.

(56) References Cited

U.S. PATENT DOCUMENTS 8,297,501 B1 * 10/2012 Kowalchyk .......... G06Q 20/102
235/380
2003/0167265 A1 * 9/2003 Corynen ................ G06Q 10/04
(Continued)

OTHER PUBLICATIONS

Kraus et al.; "A data warehouse design for the detection of fraud in the supply chain by using the benford's law"; American Journal of Applied Sciences, vol. 11, No. 9, pp. 1507-1513, 2014.
(Continued)

*Primary Examiner* — Fahd A Obeid
*Assistant Examiner* — Reva R Danzig
(74) *Attorney, Agent, or Firm* — Scully, Scott, Murphy & Presser, PC; Daniel P. Morris, Esq.

(57) ABSTRACT

An apparatus, method and computer program product for identifying fraud in transaction data. The method includes: receiving invoice data comprising a vendor, a requestor and events, receiving public data and private data sources, computing a vendor risk score using the public and private data sources matching the vendor of the invoice data, computing a requestor risk score using the public data sources and the private data sources matching the requestor of the invoice data, computing an active invoice score using the vendor risk score and the requestor risk score and when the active invoice score is greater than a predetermined amount, blocking the invoice data. In one embodiment, computing a vendor risk score comprises obtaining a weight and a confidence for the event, calculating an event vendor risk score using the weight times the confidence and combining the event vendor risk scores for all of the events.

20 Claims, 10 Drawing Sheets

(51) Int. Cl.
*G06Q 30/04* (2012.01)
*G06N 7/00* (2006.01)

(56) References Cited

U.S. PATENT DOCUMENTS

| | | |
|---|---|---|
| 2012/0221485 A1 | 8/2012 | Leidner et al. |
| 2012/0316916 A1 | 12/2012 | Andrews et al. |
| 2014/0258032 A1* | 9/2014 | Psota .................... G06Q 30/02 705/26.35 |
| 2015/0242856 A1 | 8/2015 | Dhurandhar et al. |

OTHER PUBLICATIONS

Anonymously; "Vulnerability Risk Context Scoring Scheme"; An IP.com Prior Art Database Technical Disclosure; http://ip.com/IPCOM/000232278; Undated.

IBM; "Method to Prevent Malicious Events from Affecting System Behavior based on Policies"; An IP.com Prior Art Database Technical Disclosure; http://ip.com/IPCOM/000132027; Nov. 29, 2005.

* cited by examiner

Anomalous Events Ranking Example 500

510

| NAME | DESC | DEFWGT |
|---|---|---|
| Vendor Not Registered | Vendor Not Registered in Dunns | 0.20 |
| Event or Round Dollar Invoice Amounts | Event or Round Dollar Invoice Amounts | 0.80 |
| Initials of vendor name | Initials of vendor name | 0.80 |
| Corruption Perception Index | Corruption Perception Index | 0.50 |
| Vendor Confidence | Vendor Confidence calculated using Invoice Spend Std. Dev. Mean etc (Analytic) | 0.50 |
| Consecutive Invoice Numbers | Consecutive Invoice Numbers from same supplier | 0.50 |
| Invoice Amount jumps by 50pct | Invoice Amount jumps by 50pct | 0.50 |
| Round Dollar Invoice for Vendor | Round Dollar Invoice for Vendor | 0.50 |
| Vendor with mix of invoices with PO and without PO | Vendor with mix of invoices with PO and without PO | 0.50 |

Impact of rule/criteria = weight (w) x confidence (c), where w,c in [0,1]

EQUATION (1):
If rules 1, 2 and 3 fail, then
Risk index = $1-(1-w_1 c_1)(1-w_2 c_2)(1-w_3 c_3)$

FIG. 5

| Rank | Vendor | Risk Index |
|---|---|---|
| 1 | ABC | 0.96 |
| 2 | DEF | 0.93 |
| 3 | GHI | 0.89 |

Risk Analysis Report                                                600

Location Filter:

US   US - Alabama  US - Alaska  US - American Samoa  US - Arizona  US - Arkansas   US - California   US - Colorado
US - Connecticut  US - Delaware   US - District of Columbia   US - Florida   US - Georgia   US - Guam  US - Hawaii  US - Idaho
US - Illinois   US - Indiana  US - Iowa   US - Kansas  US - Kentucky  US - Louisiana  US - Maine   US - Maryland
US - Massachusetts   US - Michigan   US - Minnesota   US - Mississippi   US - Missouri   US - Montana  US - Nebraska
US - Nevada  US - New Hampshire   US - New Jersey  US - New Mexico   US - New York   US - North Carolina
US - North Dakota   US - Ohio  US - Oklahoma   US - Oregon   US - Pennsylvania   US - Puerto Rico  US - Rhode Island
US - South Carolina  US - South Dakota   US - Tennessee   US - Texas   US - Utah  US - Vermont  US - Virgin Islands PS: By default first 5000 vendors sorted by highest to lowest "Overall Risk Score" are displayed

| Vendor | Location | Total Invoice Amount | Average Invoice Amount | No. of Invoices | No. of Events | Profile Risk Score | Transaction Risk Score | Perception Risk Score | Collusion Risk score | Overall Risk Score |
|---|---|---|---|---|---|---|---|---|---|---|
| Vendor_7549 | US - Illinois | $8,524,122 | $66,594.70 | 128 | 7 | 0 | 95 | 0 | 0 | 95 |
| Vendor_481 | US - Texas | $8,489,491 | $3,844.87 | 2,208 | 8 | 0 | 82 | 50 | 30 | 94 |
| Vendor_3 | US - Pennsylva | $92,615,44 | $6,391.68 | 14,490 | 8 | 0 | 84 | 50 | 0 | 92 |
| Vendor_929 | US - New York | $1,212,085 | $55,094.77 | 22 | 8 | 0 | 91 | 0 | 0 | 91 |

FIG. 6

Risk Management home> Procurement Risk and Fraud Management Home>

Vendor: Vendor_749

Summary:

| Vendor | Location | Total Invoice Amount | Average Invoice Amount | No. of Invoices | No. of Events | Profile Risk Score | Transaction Risk Score | Perception Risk Score | Collusion Risk score | Overall Risk Score |
|---|---|---|---|---|---|---|---|---|---|---|
| Vendor_7549 | US - Illinois | $8,524,122 | $66,594.70 | 128 | 7 | 0 | 95 | 0 | 0 | 95 |

Events:

| Risk Category | Event Name | Risk Score |
|---|---|---|
| Transaction | Consecutive Invoice Numbers | 10 |
| Transaction | Vendor with mix of invoices with PO and without PO | 28 |
| Transaction | Vendor who created PO after Invoice | 50 |
| Transaction | Vendor who created invoices with risky commodity | 30 |

Profile:

| Vendor ID | Vendor | Address | City | Country | Zip | Dunns Id | Dunns Name |
|---|---|---|---|---|---|---|---|

[ Close ]

RANKING AND TRACKING SUSPICIOUS PROCUREMENT ENTITIES

FIELD

This disclosure relates generally to systems and methods of identifying fraud/risk and particularly identifying procurement related fraud and/or risk by analyzing standard transactional data, and multiple public and private data sources, as well as using a learning component having formal guarantees to enable a principled approach to learning.

BACKGROUND

In ideal circumstances, business is carried out between vendors and customers in a manner that is fair and consistent with the law. In practice, however, fair business practices can be subject to fraud, or deliberate deception by one or more individuals or parties for personal gain and/or to cause harm to others persons or parties. A result is an illegal and unfair advantage for a party committing fraud.

Given the subversive nature of fraud, such activities can be well hidden and difficult to identify and trace to the responsible parties. Routing out the cause, including identifying entities indicative of fraud, can be a difficult if not sometimes an insurmountable task. For example, an accredited 2014 survey conducted across 100+ countries, by the Association of Certified Fraud Examiners (ACFE), shows that on average 5% of a company's revenue is lost because of unchecked fraud every year. The reason for such heavy losses according to them is that it takes around 18 months for a fraud to be caught and audits catch only 3% of the actual fraud. A large portion of risky activity is caught through whistle blowers.

In the modern era, a phenomenal amount of digital data is involved in nearly every type of business. Modern developments in both software and hardware have allowed for data analysis techniques to be developed and directed to detecting and identifying fraud and its perpetrators. In the art of fraud detection and risk analysis, analytical systems are developed and relied upon to analyze data and make predictions as to the presence of risk/fraud. Despite considerable advances in fraud detection, the ways in which parties can commit fraud have also advanced and become more elusive. There is a persisting need for novel techniques and systems for the detection and identification of fraud and the conspirators responsible, such that these techniques have a low false positive rate.

SUMMARY

A system, method and computer program product to identify fraud and/or risk which analyzes standard transactional data, and multiple public and private data sources, as well as a learning component having formal guarantees is presented. The inventive scoring mechanism ranks risky (active) invoices and takes into account not just the particular invoice related information but also information related to the corresponding vendor and the corresponding requestor which is obtained from various public and private data sources leading to a wider context and consequently improved detection. The system, method and computer program product seamlessly combines various analytical components, as well as public and private data sources leading to a more comprehensive analysis.

The system and method particularly will provide receiving at a processing device, invoice data comprising a vendor, a requestor and at least one or more events, said invoice data derived from the transaction data, receiving, at the processing device, one or more of public data sources and private data sources, computing a vendor risk score using one or more of the public data sources and the private data sources having a vendor-identifier matching the vendor of the invoice data, computing a requestor risk score using one or more of the public data sources and the private data sources having a vendor-identifier matching the requestor of the invoice data, computing an active invoice score using the vendor risk score and the requestor risk score and when the active invoice score is greater than a predetermined amount, blocking the invoice data.

In one aspect, the method will provide for each event of the invoice data: obtaining a weight for the event from information for evaluation of events from the selected one or more public and private data sources; obtaining a confidence for the event, calculating an event vendor risk score by subtracting from 1 a product of the weight and the confidence and combining, by multiplying, the non-zero event vendor risk scores for all of the events of the invoice data. In one aspect, the method will provide for each event of the invoice data: obtaining a weight for the event from the eval-info from the selected one or more public and private data sources, obtaining a confidence for the event, calculating an event requestor risk score by subtracting from 1 a product of the weight and the confidence and combining, by multiplying, the non-zero event requestor risk scores for all of the events of the invoice data.

In one aspect, the method will provide for each event of the invoice data: obtaining a weight for the event from the eval-info from the selected one or more public and private data sources, obtaining a confidence for the event, calculating an event risk score by subtracting from 1 a product of the weight and the confidence, obtaining an active invoice event risk score, by multiplying the non-zero event risk scores for all of the events of the invoice data and computing the active invoice score by multiplying the active invoice event risk score by the vendor risk score and the requestor risk score and subtracting the product of the multiplication from 1.

In one aspect, the method will provide analyzing the invoice data for text indicative of fraud. In one aspect, the method will provide using a principled approach to learning. In one aspect, the method will provide using sequential probabilistic learning to obtain the weight for the event.

In a further aspect, there is provided an apparatus for identifying fraud and/or risk in transactional data. The apparatus comprises:

a memory storage device storing a program of instructions;

a processor device receiving said program of instructions to configure said processor device to: receive invoice data comprising a vendor, a requestor and at least one or more events, said invoice data derived from the transaction data; receive one or more of public data sources and private data sources; compute a vendor risk score using one or more of the public data sources and the private data sources having a vendor-identifier matching the vendor of the invoice data; compute a requestor risk score using one or more of the public data sources and the private data sources having a vendor-identifier matching the requestor of the invoice data; compute an active invoice score using the vendor risk score and the requestor risk score; and display the active invoice score and the vendor.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 5 shows an Anomalous Events Ranking Example according to one embodiment;

FIG. 5A shows an example output illustrating the ranked listing of vendors and each respective vendor's computed risk index according to one embodiment;

FIG. 6 illustrates a Risk Analysis report according to one embodiment;

FIG. 7 illustrates details of the Risk Analysis report shown in FIG. 6;

DETAILED DESCRIPTION

Figure 1:
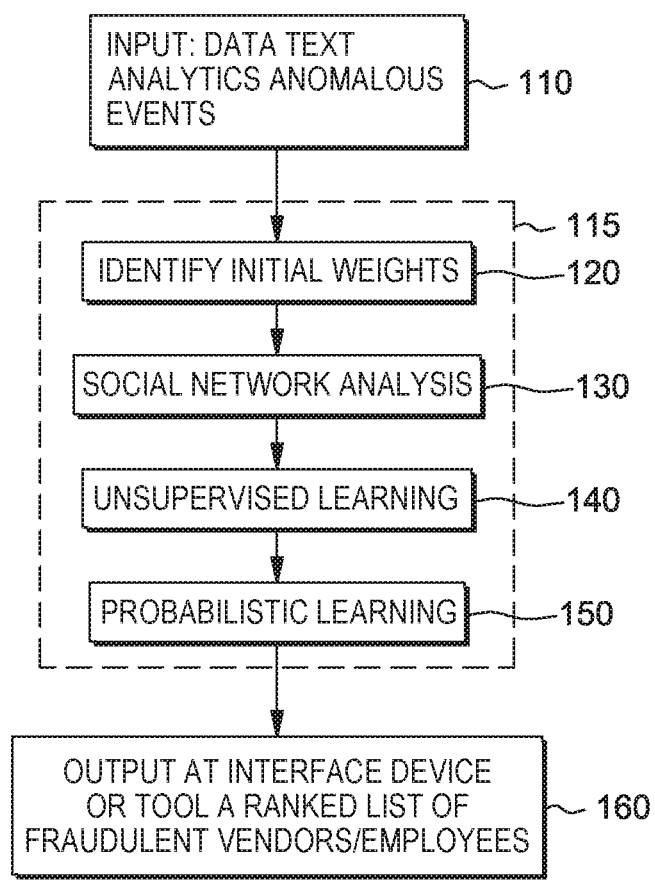
FIG. 1 depicts a computer-implemented system 100 for determining risk and/or fraud according to one embodiment.

FIG. 1 shows a computer-implemented system 100 for identifying fraud and/or risk that analyzes standard transactional data, and multiple public and private data sources, as well as a learning component having formal guarantees. The system employs methods for optimally identifying fraud and/or risk, such as in a procurement system.

FIG. 1 shows input 110 to a computer system comprising one or more types of captured data, text analytics, and anomalous events, that is, various public and private data from respective public and private data sources. This data maybe structured or unstructured. It may contain independent instances or the instances may be linked. The data is input to an analysis/analytics tool 115 which includes many different aspects that may be implemented in separate or an integral hardware. Analytics tool 115 preferably includes any one or more of the following elements: a module for Identifying Initial Weights 120, a Social Network Analysis module 130, and a machine learning module including Unsupervised Learning 140 and Probabilistic Learning 150. The tool 115 generates an output 160 including a ranked list of fraudulent vendors/employees. All of these elements may be used in conjunction with one another.

Referring to FIG. 1, execution of analytics generates output of results 160 (e.g. a ranked list of entities, e.g., fraudulent vendors/employees, based on computed risk scores and/or confidences). The output generated is supplied or provided for access by users through one or more interfaces on one or more user interface/output devices. According to an exemplary embodiment of the invention, a dashboard interface may provide an interactive interface from which a user can view summary charts and statistics, such as fraud or risk averages of captured and processed data, as well as conduct searches by entity, party, transaction type, or some other criterion or criteria. An alerts interface, which may be integral with or accessible from the dashboard, is configured to supply results of particular significance. Such results for example, may include entities and parties identified as having high confidences of collusion where a threshold value for characterization as a "high" confidence of fraud and/or collusion may be set by a user. This threshold is preferably at least equal to or greater than 0.50. Tabulated lists of vendors and/or employees can be generated and ranked according to each employee or vendor fraud/risk scores and confidences of collusion as output 160 in FIG. 1.

Figure 2:
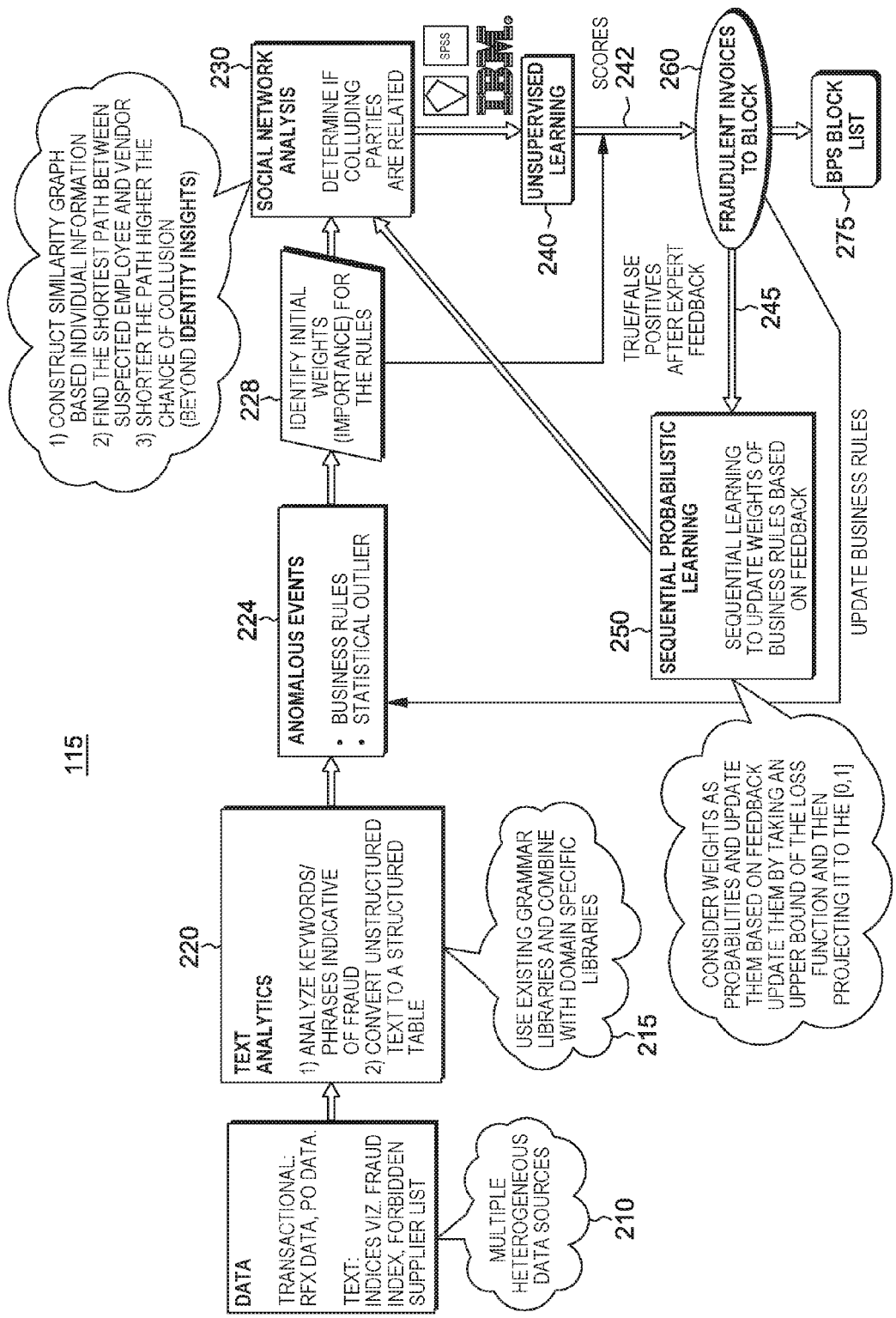
FIG. 2 depicts an Analytics Flow according to one embodiment.

FIG. 2 shows an overview of Analysis/Analytics methodology 115. Multiple heterogeneous types of data sources 210 are shown, and an amalgamate of various analytical tools provided by the system such as text analytics 220, social network analytics 230, statistical outlier detection techniques are provided to perform unsupervised learning 240 and online learning 250 with precious domain expertise comprising business rules and assigning of importance and/or weights to different anomalous events. Both the public and private data sources can include vendor-identification, e.g., a vendor name or a vendor code, and information for evaluation of events associated with the data source ("eval-info"). Some private data sources can include a Vendor Master File that typically contains information of each of the vendors registered with the company. It has name ("vendor-identification"), address(es), account number(s), the date of registration and other relevant information; the data of registration as well as some or all of the other relevant information can also be information for evaluation, e.g., "eval-info".

For example, one private data source includes record field exchange (RFx) data, which contains information about which bids for a particular product or service were sent out by whom in the company and to which vendor entity. It also has information about who won the bid and what the competitive prices proposed by the different vendors were. In some cases, fair market value for the specific product or service can be included in the data source.

Yet another private data source can include Risky Vendor Lists which are company specific lists that contain names of fraudulent or high risk suppliers based mostly on undesirable past experiences. It is desired that business not be conducted with these entities. Yet another private data source can include Vendor Bank Account Numbers which can include accounts to which the company issues payment for a product or service delivered. They may be actual account numbers or encrypted for privacy.

Yet another private data source can include Vendor-Employee Bank Account Matches. In one embodiment, human resources is given the vendor bank accounts and they can return the vendors whose account information matched that of any of the employees.

Yet another private data source can include a Risky Commodity List. Commodities are high level groupings of products or services. Certain commodities have less stringent checks (viz. higher clip levels) when buying items in that commodity, and thus vendors or employees might indicate their item belongs to one of these commodities, when in fact the item does not, in an attempt to bypass the required checks. Such commodities are thus deemed as risky and it is important to take into account this information.

Still another private data source can include Global Clip Levels. Clip levels are defined as dollar amount cutoffs for a particular purchase below which the purchase goes through significantly fewer checks and approvals than a purchase that is above the cutoff amount. These vary from country to country as well as commodity to commodity.

Still another private data source can include Company Risk Reports. Certain companies privately release risk reports that reflect the global political landscape. Such reports reveal parts of the world where there might be political or even social instabilities. This information could be useful from a risk point of view as vendors located in an unstable place might interrupt supply or might have more incentive to maximize their earnings in a short period of time given the political volatility.

Yet another private data source can include Financial Indices. Many companies maintain statistics based on maturity, stock trends and other financial yardsticks to determine the health of other companies. This information may be useful for the vendors that are being monitored.

Yet another private data source can include Social Networking Data. Company employee emails in terms of content, who they were sent to and how frequently two parties interacted could be useful information. In terms of external sources, certain businesses sell information about individuals regarding where and with whom they lived in the last decade. Also information regarding their spouses and other close relatives is available. Sometimes public profiles on social networking sites can also be accessed to reveal relations between individuals.

In addition to proprietary data sources, exemplary public data sources can include Forbidden Parties Lists, e.g., listings of suspect businesses released each year by the US government. The Denied Persons List (DPL) and the Excluded Parties List (EPL) are two of the more widely used ones.

Another proprietary data source can include Country Perception Indices that rank countries based on the levels of corruption faced by people in their daily lives in these countries. This list is created by different experts around the world, such as credible analysts and businessmen. Yet another proprietary data source can be a Tax Haven Locations List. Having vendors located in tax haven locations or their bank accounts being present in such locations could be a red flag especially with other digressions.

Yet another proprietary data source can include Advanced Search Engine Searches. Advanced searches on potentially risky vendors/employees could reveal insightful facts about the individual such as recent lifestyle changes, pending lawsuits and other such facts that might otherwise go unnoticed. Still another proprietary data source can be DUNS Numbers. Dun & Bradstreet provides a unique DUNS number and DUNS name for each business registered with them. Having a DUNS id provides a certain level of authenticity to the business.

As further shown in FIG. 2, additional sources that can be used can contain unstructured data. For example, the standard transactional data which has invoice and purchase order (PO) information can contain text fields that can serve as a rich source of information. In one embodiment, comments field can be mined to check if the work was not authorized by the company by matching certain keywords and phrases. In one embodiment, the invoice date can be extracted and compared with the PO creation date, to verify that they occurred in the correct chronological order. Sometimes, no PO is created a priori and it is created as an after thought, which is not acceptable. Also, it can be checked if there are indications that the work started prior to PO creation or that the actual commodity code is different from what has been entered into the appropriate structured field-indicating category. Other unstructured sources include risk reports, which can be mined to get a feel for the political situation in a certain country or geography. Employee emails can be mined to see if high risk words or phrases have been used in interaction with vendors indicating possible malicious activity.

In view FIG. 2, as known, text analytics processing 220 involves taking text based data and putting it into a more usable form for further processing or referencing. Text based data can include emails, documents, presentations (e.g. electronic slideshows), graphics, spreadsheets, call center logs, incident descriptions, suspicious transaction reports, open-ended customer survey responses, news feeds, Web forms, and more. The text analytics module 220 includes the analysis of keywords/phrases known to be indicative of fraud or potential fraud. This may be accomplished using libraries of words or phrases or text patterns that are not necessarily explicit in showing fraud-related activity or communications but which correspond to fraud, risk, or collusion the invention is configured to detect. In some embodiments, general grammar libraries 215 may be combined with domain specific libraries. For example, for detecting fraud in emails one might have words such as "shakkar", which has a literal translation of "sugar" but implies bribery in Hindi, as part of a domain specific library. Text analytics may be applied to any text-based data collected in the capture stage 210 to catalog, index, filter, and/or otherwise manipulate the words and content. Unstructured text, which often represents 50% or more of captured data, is preferably converted to structured tables. This facilitates and enables automated downstream processing steps which are used for processing originally unstructured/text-based data in addition to structured/numbers-based data.

In an alternative embodiment, text analytics 220 may be implemented using existing text analytic modules, such as "SPSS Text Analytics" provided by International Business Machines Corporation (IBM). In yet another embodiment, a text analytics module by Ernest & Young LLP (E&Y) may be used in accordance with the invention. A text analytics module is configured to identify communication patterns (e.g. frequency, topics) between various parties, identify and categorize content topics, perform linguistics analysis, parse words and phrases, provide clustering analysis, and calculate frequency of particular terms, among other functions. The IBM SPSS text analytics module provides certain generic libraries, which can be used in conjunction with domain specific libraries and text patterns to create a robust unstructured data mining solution. IBM SPSS allows for the seamless integration of these two sets of libraries along with problem specific text patterns. Suitable text analytics modules which may be used in accordance with the invention will be apparent to one of skill in the art in view of this disclosure.

After processing of data via text analytics module 220, data and/or structured text tables are processed via an anomalous events module 224 configured for detection and identification of anomalous events. Anomalous events are indentified based on a combination of expert-provided business rules and analytical techniques such as statistical outlier detection techniques and insights derived from text analytics. Each event can be viewed as an independent feature, which gives additional insight into the level of risk associated with a particular entity. There are hundreds of such events; examples of some such events can include, but are not limited to: vendors current invoice amount is much higher than historical invoice amounts, invoice comments field has high risk keywords/phrases, vendor name matches closely with fraudulent vendors in US government released list. Business rules which are not yet incorporated into the anomalous events module 224 may be discovered from captured data via the text analytics module 220 or directly added to the programming by a user. Business logic is instructions which, upon execution by a computer/processor, cause a computer-based system to search, create, read, update, and/or delete (i.e. "SCRUD") data in connection with compliance or violation of business rules encoded into the instructions. An anomalous events module 224 is configured to implement business logic. As an example, the anomalous events module could automatically check transactional data for the percentage of times an employee awards a contract to one or more specific and limited vendors. Results of this determination can be made immediately available to a user or be transferred to another processing module or stored in a data warehouse for future access/retrieval. An anomalous events module 224 may be configured to automatically check for violations of encoded business rules by either or both vendors and employees.

Anomalous events module 224 may further incorporate existing business logic implementations such as RCAT by IBM which is a useful business rules engine. The anomalous events module 224 in one embodiment, does allow for easy addition of other rules and statistical outlier detection techniques where all anomalous events may be updated over time as further data is made available, captured, and processed.

Important to implementation of anomalous events module 224 is identification 228 of initial weights (i.e. importance) of each rule. Initial weights are generally necessary for initial processing and the start to machine learning. Weights for different rules are updated and adjusted over time to improve the effectiveness of anomalous events module 224. That is, updating is a repetitive process that is repeated many times automatically, using an online update procedure that adjusts weights based on expert feedback. That is, if the case is fraudulent the weights for the associated events would increase; otherwise, the weights would reduce. The initial weights were set based on the recommendation of domain experts.

Anomalous events module 224 can further allow for initial determinations of possible colluding parties. However, motivations and reasons for collusion are often not readily apparent. This inhibits the accuracy of determining a probability that fraud and/or collusion are in fact present with respect to various entities. Publicly sourced data, particularly social network/social media data, is used together with privately sourced data, particularly transactional data, for identifying possible fraud/risk and collusion and provide more accurate numerical probabilities of illegal activity in procurement.

In one embodiment, an example business rule for detecting an anomalous event may include: a Vendor Requestor Monopoly rule that checks to see if a high percentage (>90%) of invoices from a particular vendor are approved by a single employee in the company. In this situation, there is a higher chance of collusion as a single employee has quite some control in accepting or rejecting the vendor invoices.

Another rule for detecting anomalous events can include a High Spend Vendors rule that identifies vendors in each country with whom the company is spending (statistically) significantly more than an average vendor in that country. If such a high spend vendor is not an expected one, the vendor should be flagged. To account for this, the event is triggered for vendors with whom yearly spend is above a certain confidence level but below a higher confidence level computed for each country using the corresponding vendor yearly spends.

Yet another rule for detecting anomalous events can include a Benfords Test. Benfords law provides an expected distribution of the frequency of the most significant digit in a sequence of numbers given that they were generated from a real-world process. This distribution has been observed in varied domains such as in surface areas of rivers, molecular weights, death rates, and/or street addresses. Statistical testing can be performed based on Benfords Law by comparing the expected distribution with the actual distribution of most significant digit of the invoice numbers for a vendor observed in the company's data. In one embodiment, the chi-square test can be performed, where the null hypothesis states that the invoice numbers were generated from a real source. The event can be triggered, for example, in the case in which the p-value≤0.05.

Yet another rule for detecting anomalous events can include a rule to detect a PO Create Date after Invoice Date. Yet another anomalous event rule can include detecting Mix of PO and Non-PO Invoices. Usually a vendor will provide goods or services with a PO corresponding for each such transaction. For some vendors the goods or services are so cheap and frequent that PO is not required to be created. However, having a mix of both is a red flag since, vendors should belong to only one of these categories. Still another anomalous event can be Invoices with Risky Commodity Code. As described above, certain commodity codes have higher clip levels after which they go through stringent checks. To bypass these checks an incorrect high clip level commodity may be entered for an invoice, which would trigger this event. Yet another anomalous event can be Country Corruption. This event is triggered for countries with CPI below 50. The confidence that is computed for this event is described in more detail below. Still another anomalous event can be Unfair Win. Once a bid is thrown by a company, if the vendor that wins the bid demands significantly more than the historical/fair market price, then this event is triggered.

Further integral with or in communication with the analytics tool 115 is a social network analysis module 230 that processes social media data. For example, social media data may be collected or acquired from one or more of a wide variety of social media networks and companies offering social media services including, but not limited to: Facebook (including Instagram), Twitter, Google (including Google+ and YouTube), LinkedIn, Tumblr, etc. Social network analysis module 230 is run to elucidate or render apparent a tremendous range of relationships or connections, such as but not limited to the following: familial, romantic, greek/fraternal, professional, virtual, community/regional, and generalized person-to-person or group-to-group (e.g. between institutions, organizations, or persons having common or shared interests, values, goals, ideals, motivations, nationality, religious ideology, recreational interests, etc). Any salient relationship, connection, or tie, be it positive or negative, between one person/group and another person/group may be discerned from social media data.

Social network analysis module 237 may further process social media data in conjunction with transactional data processed via text analytics module 235 and anomalous events module 243. To make a determination if colluding parties are related (e.g., according to one or more of the above identified relationships), a similarity graph may be constructed based on information specific to each individual. Two or more similarity graphs corresponding to separate persons or groups may then be compared and a determination made as to the shortest path between a suspected employee and vendor. Potentially colluding employee(s) and vendor(s) are identified by the anomalous events module 243 as discussed above. Similarity graphs may be compared randomly according to continuous and iterative search and identification processing.

As further shown in FIG. 2, a machine learning module 240 may be implemented in the form of "unsupervised" learning as well as "supervised" learning, or more specifically sequential probabilities learning 250. It should be noted that although unsupervised learning and sequential probabilities learning are shown in independent boxes in FIG. 2, algorithms providing either unsupervised learning or supervised learning may be used integrally with the modules discussed, including analytics module 220, anomalous events module 224, and social network analysis module 230. Unsupervised learning 240 is related to and may include pattern recognition and data clustering, these concepts being readily understood to one of ordinary skill in the art. Algorithms providing for unsupervised learning, and by connection the hardware configured for execution of such algorithms, are provided data generally without labels. In particular, a datum may not be initially distinguished from another datum with respect to supplying a determination of fraud/risk associated with some entity. The algorithms provide for identification of for example, patterns, similarities, and dissimilarities between and among individual datum and multiple data. Unsupervised learning algorithms can effectively take unlabeled data input and identify new suspect patterns as well as sequences of events that occur infrequently but with high confidence. Unsupervised learning module 240 provides related scores and confidences 242.

The sequential probabilistic learning component 250, in contrast to unsupervised learning 240, has labeled data input such that the algorithms effectively have "model" data off of which to draw comparisons and make conclusions. Expert feedback 245 may be received from users through input devices such as workstation terminals connected to the system network. Feedback 245 can provide concrete indications of particular data, anomalous/intelligent events, etc. which provide support or evidence of fraud and/or collusion between and among different entities. This feedback 245, which preferably includes identification of true/false positives in the results generated via the unsupervised learning algorithms 240, may then be used to update parameters affecting future data captured and supplied as input to the social network analysis module 230 and unsupervised learning algorithms 240. Specifically, either or both anomalous events module 224 and weights applied to rules in weighting step 228 may be updated in response to feedback 245. Violation of a business rule does not provide conclusive evidence of fraud or collusion. However, violation of some business rules provides greater confidence of collusion than violation of certain other rules. Thus the former rules should have greater weights. In addition, the frequency, number, and combination of business rules which are violated can be used to improve the accuracy and confidence of collusion respecting fraud/risk between any two or more employees and vendors. Combining this information with social network analysis via a social network analysis module 230 further improves fraud identification results. Results from sequential probabilistic learning 250 fed back to social network analysis module 230 provides a corrective feedback loop which can improve the output (e.g. scores and confidences 242).

There are existing algorithms and program modules commercially available which may be used for supervised learning in the practice of the invention. These include, for example, "Fractals" offered by Alaric Systems Limited. Alaric identifies "Fractals" as being "self learning", whereby the program "adapts" as human users (fraud analysts) label transactions as fraudulent. This solution uses a Bayesian network trained over labeled data to come up with suggestions. The primary limitation of this tool is that it requires labeled data, which in many real scenarios, such as detection of fraud in procurement, is not readily available. The system as taught herein does not require labeled data which makes it more generally applicable. Moreover, the sequential probabilistic learning 250 component is light weight. That is, it is extremely efficient to train with feedback 245 and does not overfit to the data, which results in low false positive rate.

In one embodiment, the system does not use labeled data so that it cannot train a supervised model to rank entities based on a fraud score. To limit the number of false positives, however, an initial weighting is created, this weighting signifying the importance of the different events using a combination of domain expertise and the frequency of occurrence of the different events. In particular, a weight in the set [0, 1] is derived, where a higher weight indicates that the event is more important in identifying fraud. These weights are based on evaluation of the events with experts and further on the system devaluing events that occur frequently based on analysis of real data. The initial weights are determined by the domain experts.

In one embodiment, weights of individual events are normalized i.e., between [0,1], so that they are interpretable. The weight of an event can be viewed as the probability that a fraud has occurred given that the particular event was triggered. Such semantics can make it easier for the expert not only to be able to interpret the importance of events available in the system, but also to determine the relative importance of new events that may be added in the future. This is not the case if the events have unbounded weights. Events are triggered when the condition of the event is satisfied. For example, the event that invoice amount is too high is triggered if the current invoice amount of the vendor is significantly higher than his historical invoice amounts.

Confidences of events are complimentary to their weights. While weights indicate the importance of an event in detecting fraud, confidences signify a belief in the occurrence of the event. For example, consider the vendor requestor monopoly event; it either occurs or doesn't occur. If the event is triggered, confidence would be 1, otherwise confidence would be 0. The confidence is different from the weight, which is a fixed number irrespective of whether the event occurs or not. Both of these indicators, that is, confidences and weights, can be used to determine the probability of fraud by an entity. Confidences for most events are either 1 or 0 depending on if they are triggered or not respectively. However, they are a real number between [0, 1] for some events. One example is the country corruption event. The confidence for this event can be calculated as follows: cCPI=100−CPI/100. CPI lies between [0, 100], where a higher CPI indicates lesser risk. However, the calculation, can be performed so that the confidence can be in [0, 1], where a higher value indicates a stronger signal for the event.

As discussed above, each event i is associated with a weight $w_i \in [0, 1]$ and given an entity E there is a corresponding confidence $cE_i \in [0, 1]$ of occurrence. Thus, the probability that an entity is fraudulent/risky is 1 minus the probability that it is not fraudulent. The probability that it is not fraudulent is the probability that none of events that are triggered for it are fraudulent. Formally, given a total number of n possible events $I = \{1, \ldots, n\}$ the probability that entity E is fraudulent is given by, $$PfE = 1 - \Pi i \in I(1 - w_i cE_i) \quad (1)$$

where for any event i, $w_i$, $cE_i$ is fraudulent given that the event was triggered with confidence $cE_i$ and where $\Pi$ stands for product (multiplication). Notice that for events that are not triggered for entity E, the corresponding confidences $cE_i$ would be 0, thus not contributing to the overall fraud probability.

Entities can now be ranked in descending order based on the calculated score namely, the fraud probability PfE. Entities higher up in the list would be potentially of more interest than those lower down. Information regarding entities of interest can then be passed to other investigative tools. Results of the investigation can be entered into the tool as feedback or can lead to updating of the events as shown in FIG. 2.

Entities can be configured with whatever universe of events that are available at a particular stage of the system development, as shown in Equation (1). Hence, even without the social networking and unsupervised learning component, a ranked list can still be obtained. This is depicted in FIG. 2 by the thin arrow connecting the weights assignment block to the ranked list block.

Figure 3:
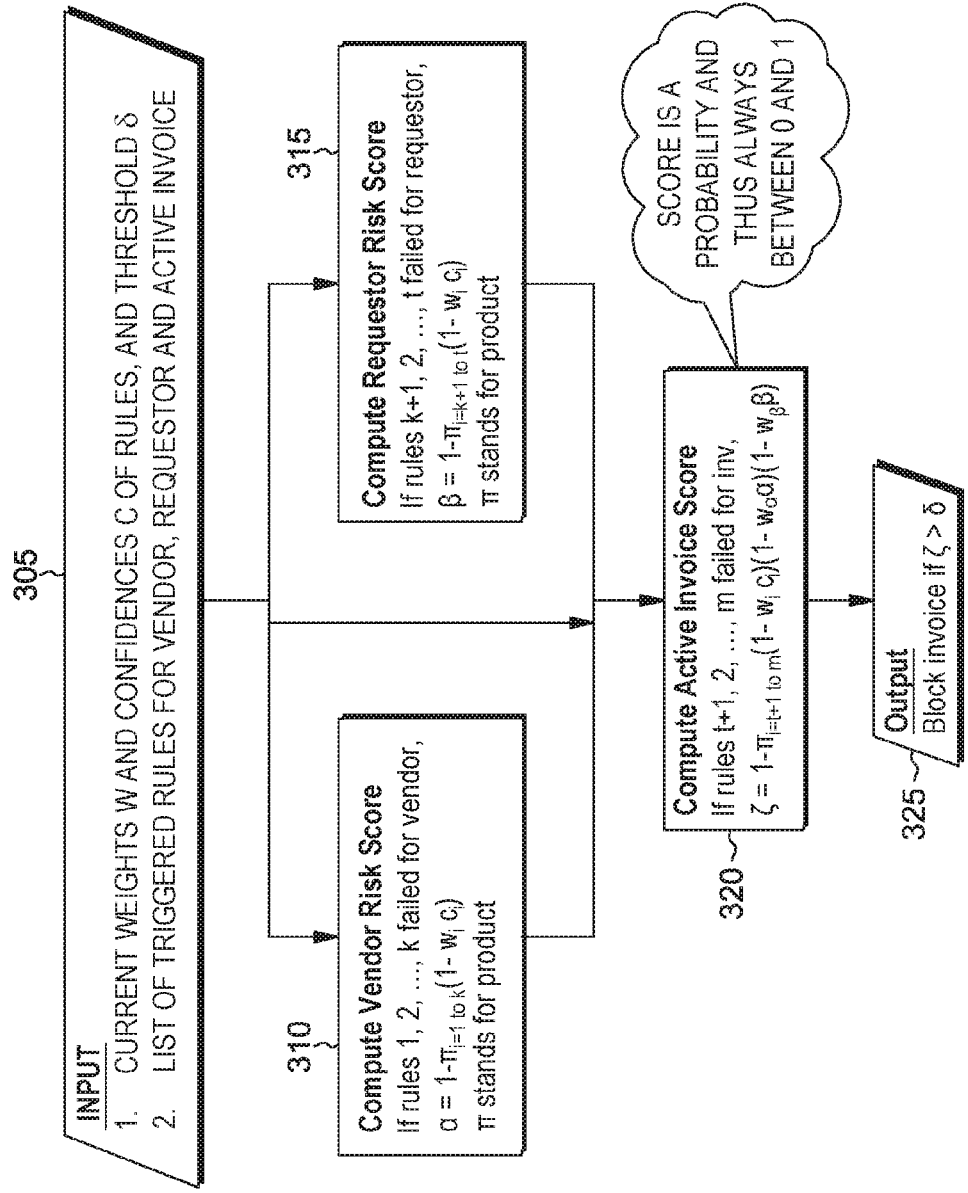
FIG. 3 depicts an Active Invoice Scoring and Blocking example according to one embodiment.

FIG. 3 shows an embodiment of Active Invoice Scoring and Blocking module 300 run in the computer system as an additional module shown in FIG. 2. In this embodiment, the system receives inputs at 305 comprising: (1) current weights W ($w_i$) and confidences C ($c_i$) of rules, a threshold value ($\delta$), and (2) a list of triggered rules for vendor, requestor and active invoice. This input is used to compute at 310 vendor risk score as follows: If rules $1, 2, \ldots, k$ failed for vendor, then compute: $\alpha = 1 - \Pi_{i=1 \text{ to } k}(1 - w_i c_i)$ where H stands for a product operation. The module 305 is run in FIG. 2 whenever the fraud system is executed. Currently, this may be done periodically, e.g., daily. Also the input 305 is used to compute at 315 requestor risk score as follows: If rules $k+1, 2, \ldots, t$ failed for requestor, then compute: $\beta = 1 - \Pi_{i=k+1 \text{ to } t}(1 - w_i c_i)$. The method further computes an Active Invoice Score 320 as follows: If rules $t+1, 2, \ldots, m$ failed for invoice (inv), then compute: $\zeta = 1 - \Pi_{i=t+1 \text{ to } m}(1 - w_i c_i(1 - w_\alpha \alpha)(1 - w_\beta \beta)$. Note that the score is a probability and thus is always between 0 and 1. Accordingly, at 325, the method outputs a "Block invoice" or an invoice having a fraudulent message, if $\zeta > \delta$. In other words, if the Active Invoice Score ($\zeta$) is greater than a predetermined amount ($\delta$), then fraud or risk is determined and the invoice should be blocked instead of paid, or at least marking the invoice as a high risk for an expert user to investigate. In one embodiment, threshold $\delta$ is determined by the experts reviewing the results. Note that this output is better than an additive score which can be unbounded; it is difficult to get a qualitative feel for such unbounded scores.

Figure 4:
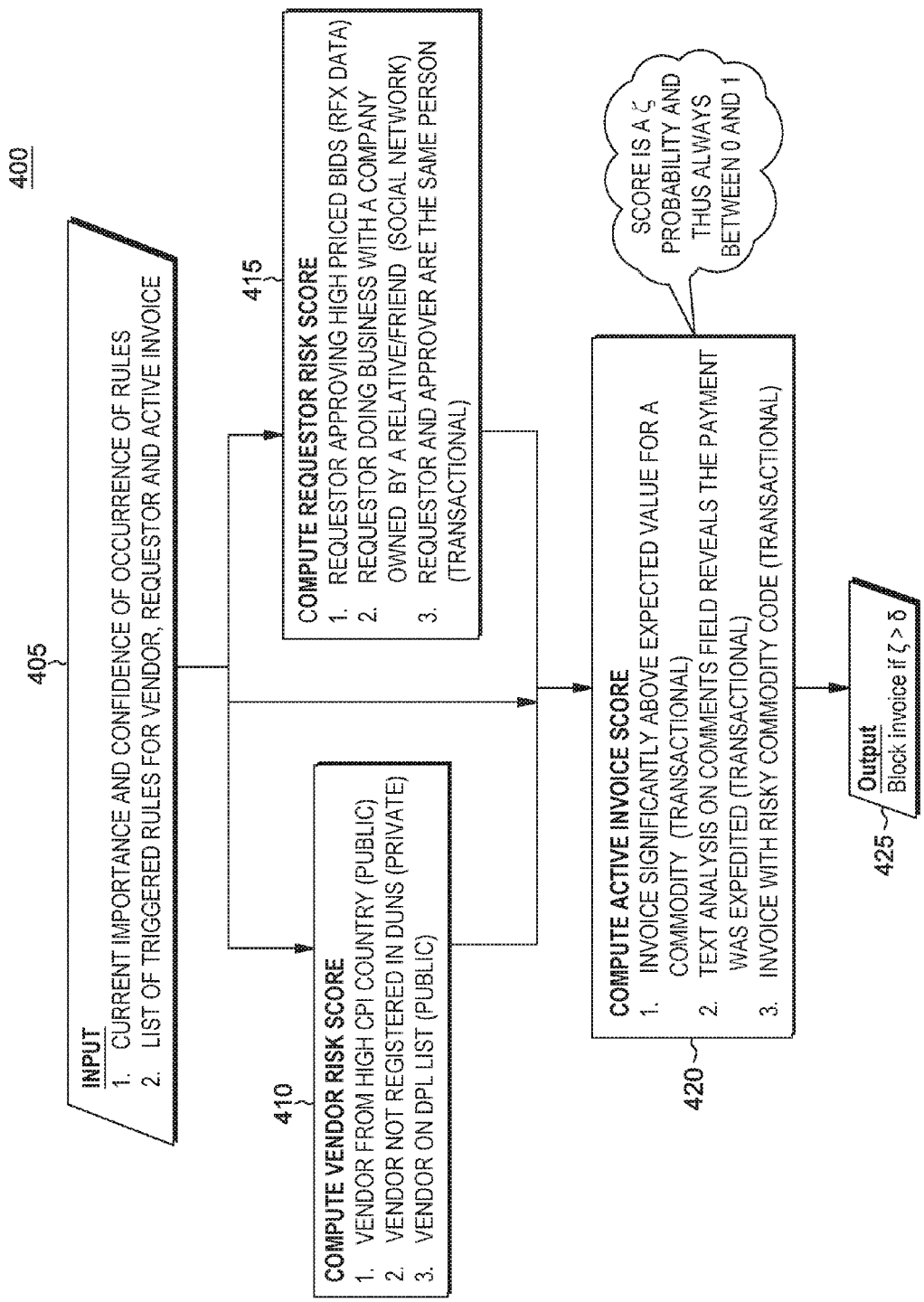
FIG. 4 depicts an Active Invoice Scoring and Blocking Context Example according to one embodiment.

FIG. 4 shows a further embodiment of Active Invoice Scoring and Blocking module 400 run in a computer system which is run in the computer system shown in FIG. 2. In this example, the Active Invoice Scoring and Blocking module receives inputs at 405 comprising: (1) current importance (weight w) and confidence (c) of occurrence of rules, and (2) a list of triggered rules for vendor, requestor and active invoice. In one embodiment, example rules may include, but are not limited to: a vendor's current invoice amount is much higher than historical invoice amounts; an invoice's comments field has high risk keywords/phrases; a vendor name matches closely with fraudulent vendors in US government released list. The method further computes a Compute Vendor Risk Score at 410 in accordance with making one or more of the following determinations: (1) Vendor from high CPI country (public), (2) Vendor not registered in DUNS (private), and (3) Vendor on DPL list (public). In addition, the method further computes a Compute Requestor Risk Score at 415 in accordance with making one or more of the following determinations: (1) Requestor approving high priced bids (RFx data), (2) Requestor doing business with a company owned by a relative/friend (social network), and (3) Requestor and approver are the same person (transactional). The method further computes a Compute Active Invoice Score at 420 in accordance with making one or more of the following determinations: (1) Invoice significantly above expected value for a commodity (transactional), (2) Text analysis on comments field reveals the payment was expedited (transactional), and (3) Invoice with risky commodity code (transactional). As above, note that score is a probability and thus is between 0 and 1. The system generates an output message to Block invoice at 425, and/or a fraudulent invoice message if $\zeta > \delta$ at 425. The scores are computed as in equation 1. An invoice being "blocked" may be an action that the invoice is not to be paid to the vendor, rather it is kept under investigation. As shown in FIG. 2, the output would be a list 275 of the blocked invoices and they would be marked.

FIG. 5 provides example results of an Anomalous Events Ranking example 500. The ranking is performed in block 260, FIG. 2 based on the scores 242. The table 510 of FIG. 5 shows Vendor Name ("Name"), description ("Desc") and default weight ("DEFWGT") columns. In one embodiment, for example, as shown in the top row of this top table, if a vendor is not registered (Name=Vendor Not Registered), which can be described as a vendor who is not listed in DUNS, then one weight applied to this vendor is 0.20. As shown in row 2, when the invoice is an even dollar amount (Name=Even or Round Dollar Invoice Amounts), then another weight applied to this vendor is 0.80. Accordingly, when a rule or anomalous event is triggered, it is applied to the Risk Score. The impact or application of a rule, or criteria, is calculated by multiplying the weight of the rule (for example, as the DEFWGT shown in the table 510) by the confidence for the rule or criteria, i.e., Impact of rule/criteria=weight($w_i$)×confidence($c_i$), where $w_i, c_i$ in [0,1].

The Risk Index for the vendor can be calculated using Equation (1) above. It is noted that if rules 1, 2 and 3 fail, then the risk index, i.e., the probability that entity E is fraudulent, is given by:

$$1 - [(1 - w_1 c_1)(1 - w_2 c_2)(1 - w_3 c_3)]$$

FIG. 5A shows an example output 560 computed by the system illustrating the ranked listing of vendors and each respective vendor's computed risk index.

FIG. 6 is an example Risk Analysis Report 600 generated by the system block 260 according to one embodiment. The columns in the table on the lower portion of the Report include vendor, location, total invoice amount, average invoice amount, number (No.) of invoices, number (No.) of events, profile risk score, transaction risk score, perception risk score, collusion risk score, and overall risk score. They are computed using equation 1, with the events corresponding to these categories. In this display, for example vendor 605, e.g., Vendor_7549, the total invoice amount is $8,524,122, the average invoice amount is $66,594.70, and the number of invoices is 128. Further, Events is 7, profile risk score is 0, transaction risk score is 95, perception risk score is 0, collusion risk score is 0 and overall risk score is 95. The risk scores are determined by taking the original scores which are calculated as percentages and have values between 0 and 1, and multiplying by 100. The data is presented sorted highest to lowest by overall risk score with the highest score ("95") in the top row.

FIG. 7 is a Vendor report showing details from the Risk Analysis Report of FIG. 6. The vendor report also is generated in module 260 of FIG. 2. Details for vendor Vendor_7549 are shown. In particular, the Events columns of Risk Category, Event Name and Risk Score are shown. The Events in this display for Vendor_7549 are all of Risk Category "Transaction". The Event Names displayed are "Consecutive Invoice Numbers", "Vendor with mix of invoices with PO and without PO", Vendor who created PO after invoice" and Vendor who created invoices with risky commodity". A Risk Score, a number between 0 and 100, for each of these Event Names are displayed. As shown, for event "Consecutive Invoice Numbers", the Risk Score is 10. For event "Vendor with mix of invoices with PO and without PO", the Risk Score is 28. For event "Vendor who created PO after invoice", the Risk Score is 50, and for Event "Vendor who created invoices with risky commodity", the Risk Score is 30. They are computed using equation 1 multiplied by 100. This is computed in block 260 in FIG. 2.

Figure 8:
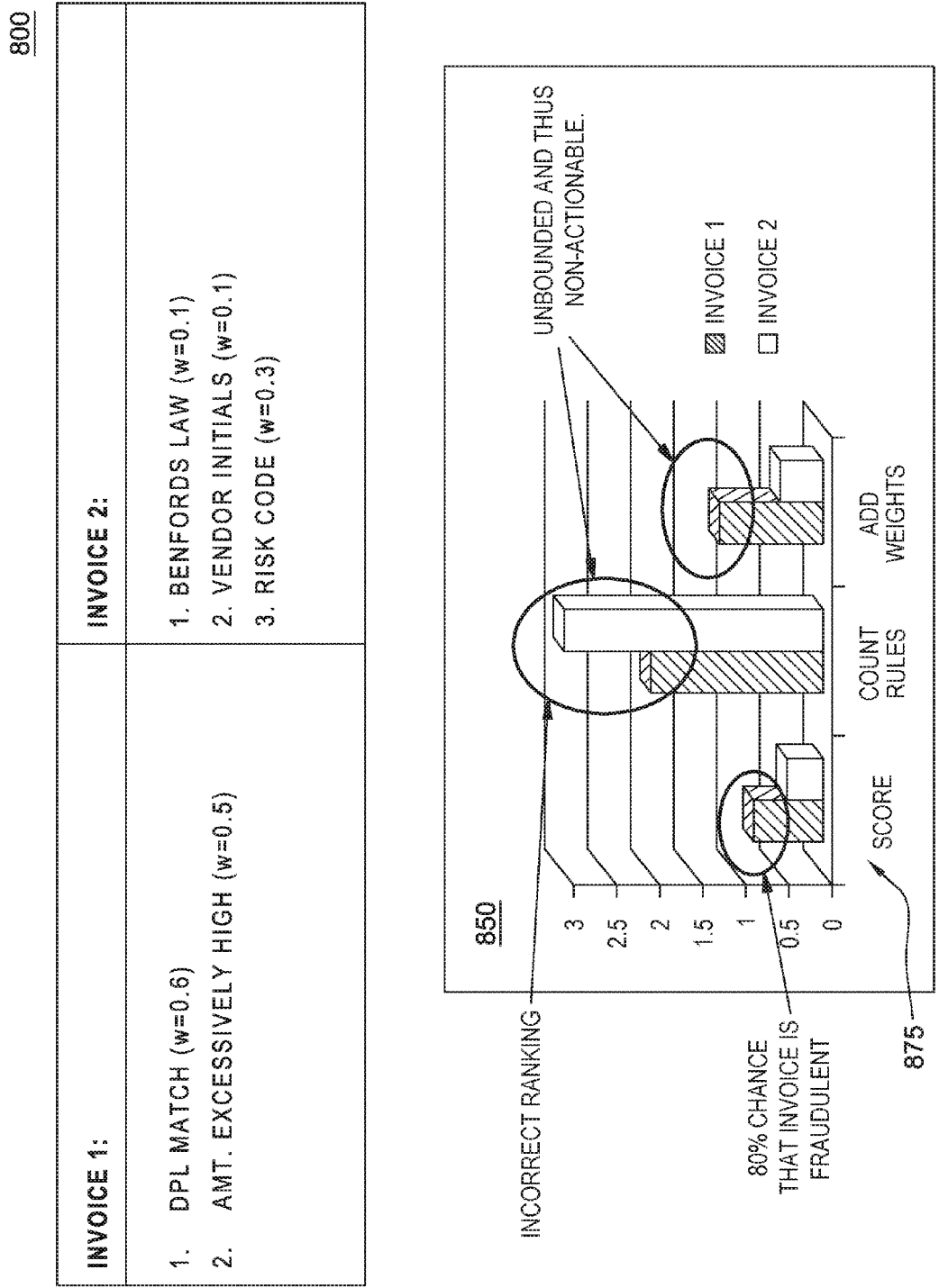
FIG. 8 illustrates example risk analysis comparisons for example invoices according to one embodiment.

FIG. 8 illustrates one embodiment of the invention showing example risk analysis comparisons computed for two example invoices: Invoice 1 and Invoice 2. For Invoice 1, DPL match has a weight as 0.6 and Amt. excessively high has a weight of 0.5. For Invoice 2, Benfords Law has a weight of 0.1, vendor initials has a weight of 0.1 and risky code has a weight of 0.3, for example. These example weights would either be initial weights given by the domain experts or the learned weights based on the machine learning method. In accordance with one embodiment, for Invoice 1, since three rules have failed, the impact of these three rules is calculated in a Risk Index determined using Equation (1) above. In this example, the Risk Index for Invoice 1 is $1-(1-w_1c_1)*(1-w_2c_2)*(1-w_3c_3)$. Similarly, the Risk Index for Invoice 2 is $1-(1-w_1c_1)*(1-w_2c_2)$. Accordingly, the graph 850 provide analysis scores 875 that show that the Risk Invoice for Invoice 1 has an 80% chance of being fraudulent and the Risk Invoice for Invoice 2 has a 28% chance of being fraudulent. Thus, Invoice 1 is more likely to be fraudulent than Invoice 2. By contrast, if one merely counts the number of rules, e.g. "Count Rule" as shown in the center bar comparison chart 850, then Invoice 2, which violates three rules would be considered to be more likely to be fraudulent than Invoice 1 which violates only two rules. Further, if one merely adds the weights, e.g., "Add Weights" as shown in the right-hand bar chart, then Invoice 1 that has a total weight of 1.1 would be considered to be more likely to be fraudulent than Invoice 2 that has a total weight of 0.5. However, when the weights are merely counted or added, the maximum total weight is unbounded and thus non-actionable. Accordingly, as illustrated in FIG. 8, the Risk Analysis scores 875 computed according to these techniques is more robust than current methods at predicting fraudulent invoices.

Figure 9:
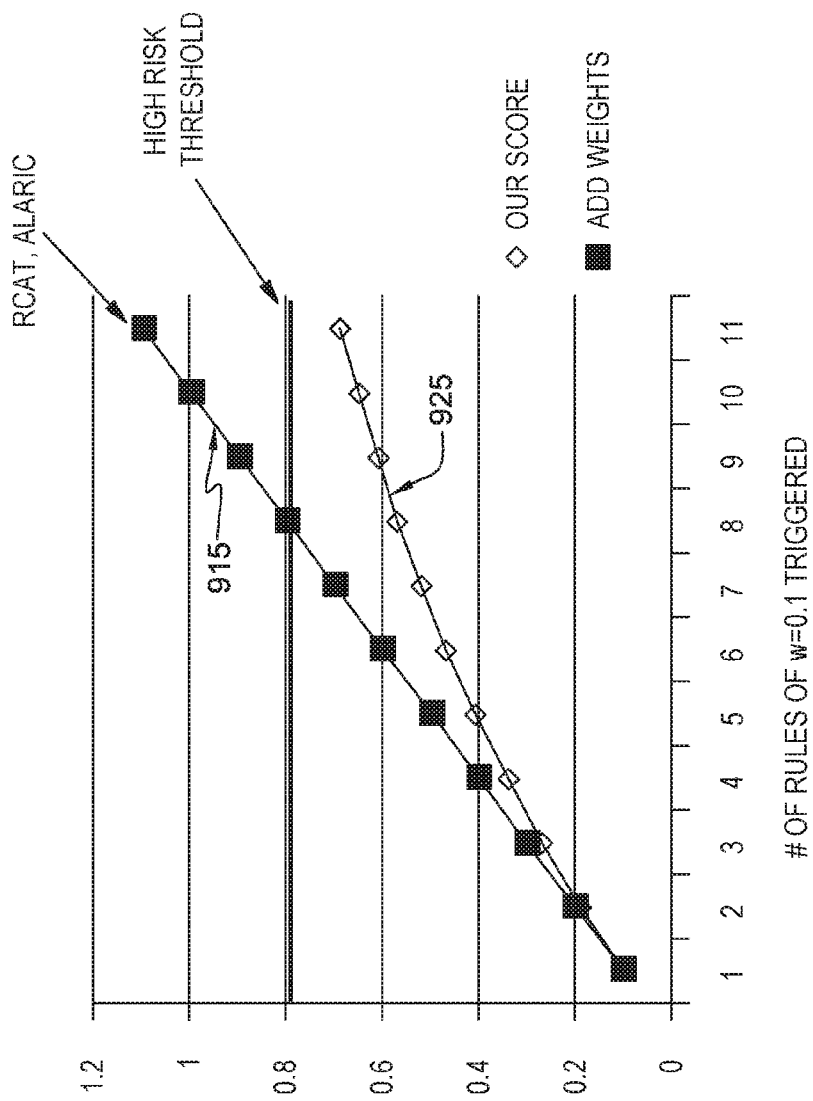
FIG. 9 shows a display generated by one embodiment of the present invention.

FIG. 9 shows the output of another embodiment. This example output 900 is a graph illustrating that invoices failing critical rules will show at the top with the scoring mechanism of the present embodiment, which may not be the case if the weights are merely added. In particular, FIG. 9 shows a High Risk Threshold; this Threshold is easily achieved when the weights are merely added or summed 915. In contrast, using the Risk Analysis techniques of the embodiments herein, the weights are combined in accordance with Equation (1) above, e.g., weights are combined with confidences at 925 such that the High Risk Threshold is not achieved merely by increasing the number of weighted events. That is, in this example, an increased number of Rules of w=0.1 triggered as shown along the x-axis of the graph of FIG. 9 (number of weighted events) is shown not to achieve the high risk threshold value.

Figure 10:
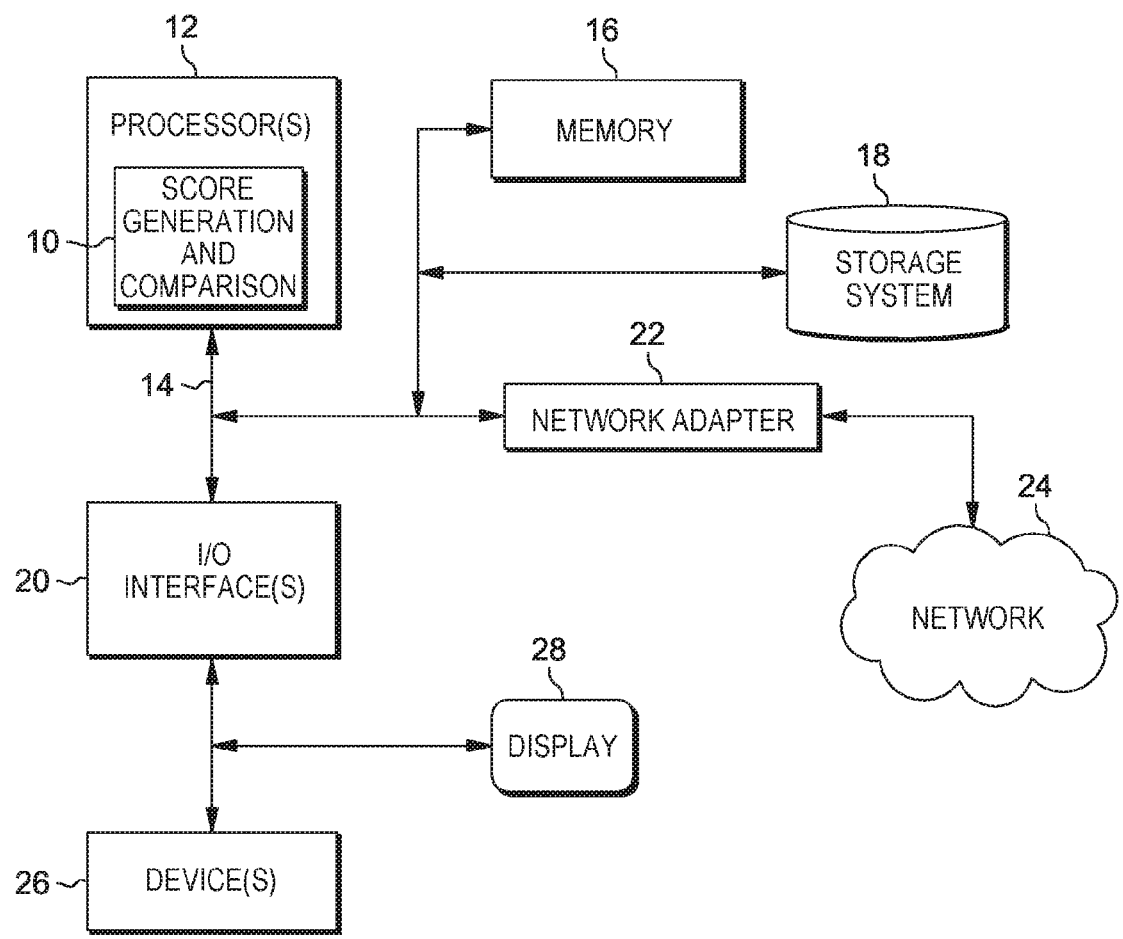
FIG. 10 depicts an exemplary hardware configuration for performing methods such as described in one embodiment.

FIG. 10 illustrates a schematic of an example computer or processing system that may implement the methods to rank and track suspicious procurement entities according to the embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods 300/400 described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of identifying fraud in transaction data, comprising:
    receiving, by a processor, the transaction data comprising a vendor, a requestor, invoice data, and at least one event;
    receiving, by the processor, one or more of public data sources and private data sources indicating a set of rules relating to the transaction data;
    obtaining, by the processor, a set of weights for the set of rules, wherein each weight of a rule corresponds to an importance of the rule in the fraud identification;
    for each event among the at least one event:
        obtaining, by the processor, a set of indications, wherein each indication comprises a confidence of whether the event violated each rule among the set of rules;
        computing, by the processor, a vendor risk score based on a subset of the weights for a first subset of rules violated by the event, the first subset of rules are associated with the vendor;
        computing, by the processor, a requestor risk score based on a subset of the weights for a second subset of rules violated by the event, the second subset of rules are associated with the requestor;
    determining, by the processor, an active invoice score for the transaction data using the vendor risk score and the requestor risk score of each event;
    when the active invoice score is greater than a predetermined amount, blocking, by the processor, the transaction data;
    sending, by the processor, a notification to a device that the transaction data is being blocked;
    obtaining, by the processor and from the device, feedback data comprising one of:
        true positive indicators indicating that fraud is present in the blocked transaction data;
        false positive indicators indicating that fraud is absent from the blocked transaction data; and
    adjusting, by the processor, the set of weights for the set of rules based on the feedback data, wherein the adjusting comprises:
        increasing at least one weight for the set of rules in response to a presence of true positive indicators in the feedback data; and
        decreasing the at least one weight for the set of rules in response to a presence of false positive indicators in the feedback data.

2. The method of claim 1, wherein computing a vendor risk score comprises:
    for each rule among the first subset of rules, determining an event vendor risk score by subtracting a product of the weight and the confidence from a value of one;
    determining a product of the event vendor risk scores for the first subset of rules; and
    determining the vendor risk score by subtracting the product from a value of one.

3. The method of claim 2 further comprising using sequential probabilistic learning to obtain the set of weights.

4. The method of claim 1, wherein the computing a requestor risk score comprises:
    for each rule among the second subset of rules, determining an event requestor risk score by subtracting a product of the weight and the confidence from a value of one; and
    determining a product of the event requestor risk scores for the second subset of rules; and
    determining the requestor risk score by subtracting the product from a value of one.

5. The method of claim 1, wherein the computing the active invoice score comprises:
   determining a first product based on a subset of the weights for a third subset of rules violated by the at least one event, the third subset of rules are associated with the invoice data;
   for each rule among the third subset of rules, determining an event risk score by subtracting the first product from a value of one;
   determining a second product of the difference, the vendor risk score, and the requestor risk score; and
   determining the active invoice score by subtracting the second product from a value of one.

6. The method of claim 1, further comprising analyzing the transaction data for text indicative of fraud.

7. The method of claim 1 further comprising a principled approach to learning.

8. An apparatus for identifying fraud in transaction data, the apparatus comprising:
   a memory storage device storing a program of instructions;
   a processor device receiving said program of instructions to configure said processor device to:
   receive the transaction data comprising a vendor, a requestor, invoice data, and at least one event;
   receive one or more of public data sources and private data sources that indicate a set of rules relating to the transaction data;
   obtain a set of weights for the set of rules, wherein each weight of a rule corresponds to an importance of the rule in the fraud identification;
   for each event among the at least one event:
      obtain a set of indications, wherein each indication comprises a confidence of whether the event violated each rule among the set of rules;
      compute a vendor risk score based on a subset of the weights for a first subset of rules violated by the event, the first subset of rules are associated with the vendor;
      compute a requestor risk score based on a subset of the weights for a second subset of rules violated by the event, the second subset of rules are associated with the requestor;
   determine an active invoice score for the transaction data using the vendor risk score and the requestor risk score; and
   display the active invoice score and the vendor on a device;
   obtain, from the device, feedback data comprising one of:
      true positive indicators indicating that fraud is present in the blocked transaction data;
      false positive indicators indicating that fraud is absent from the blocked transaction data; and
      adjust the set of weights for the set of rules based on the feedback data, wherein the adjustment comprises:
         increase at least one weight for the set of rules in response to a presence of true positive indicators in the feedback data; and
         decrease the at least one weight for the set of rules in response to a presence of false positive indicators in the feedback data.

9. The apparatus of claim 8, wherein to compute the vendor risk score, the processor device is further configured to:
   for each rule among the first subset of rules, determine an event vendor risk score by subtracting a product of the weight and the confidence from a value of one;
   determine a product of the event vendor risk scores for the first subset of rules; and
   determine the vendor risk score by subtracting the product from a value of one.

10. The apparatus of claim 9, wherein the processor device is further configured to use sequential probabilistic learning to obtain the set of weights.

11. The apparatus of claim 8, wherein to compute the requestor risk score, the processor device is further configured to:
   for each rule among the second subset of rules, determine an event requestor risk score by subtracting a product of the weight and the confidence from a value of one; and
   determine a product of the event requestor risk scores for the second subset of rules; and
   determine the requestor risk score by subtracting the product from a value of one.

12. The apparatus of claim 8, wherein to compute the active invoice score, the processor device is further configured to:
   determine a first product based on a subset of the weights for a third subset of rules violated by the at least one event, the third subset of rules are associated with the invoice data;
   for each rule among the third subset of rules, determine an event risk score by subtracting from 1 a product of the weight and the confidence; and
   determine a second product of the difference, the vendor risk score, and the requestor risk score; and
   determine the active invoice score by subtracting the second product from a value of one.

13. The apparatus of claim 8, wherein the processor device is further configured to:
   analyze the transaction data for text indicative of fraud.

14. The apparatus of claim 8, wherein the processor device is further configured to perform a principled approach to learning.

15. A computer readable storage medium, tangible embodying a program of instructions executable by the computer for identifying fraud in transaction data, the program of instructions, when executing, performing the following steps:
   receiving, by a processor, the transaction data comprising a vendor, a requestor, invoice data, and at least one event;
   receiving, by the processor, one or more of public data sources and private data sources that indicate a set of rules relating to the transaction data;
   obtaining, by the processor, a set of weights for the set of rules, wherein each weight of a rule corresponds to an importance of the rule in the fraud identification;
   for each event among the at least one event:
      obtaining, by the processor, a set of indications, wherein each indication comprises a confidence of whether the event violated each rule among the set of rules;
      computing, by the processor, a vendor risk score based on a subset of the weights for a first subset of rules violated by the event, the first subset of rules are associated with the vendor;
      computing, by the processor, a requestor risk score based on a subset of the weights for a second subset of rules violated by the event, the second subset of rules are associated with the requestor;

determining, by the processor, an active invoice score for the transaction data using the vendor risk score and the requestor risk score of each event;

when the active invoice score is greater than a predetermined amount, blocking the transaction data;

sending, by the processor, a notification to a device that the invoice is being blocked;

obtaining, by the processor and from the device, feedback data comprising one of:
- true positive indicators indicating that fraud is present in the blocked transaction data;
- false positive indicators indicating that fraud is absent from the blocked transaction data; and adjusting, by the processor, the set of weights for the set of rules based on the feedback data, wherein the adjusting comprises:
- increasing at least one weight for the set of rules in response to a presence of true positive indicators in the feedback data; and
- decreasing the at least one weight for the set of rules in response to a presence of false positive indicators in the feedback data.

16. The computer readable storage medium of claim 15, wherein the computing a vendor risk score comprises:
for each rule among the first subset of rules, determining an event vendor risk score by subtracting a product of the weight and the confidence from a value of one;
determining a product of the event vendor risk scores for the first subset of rules; and
determining the vendor risk score by subtracting the product from a value of one.

17. The computer readable storage medium of claim 15, wherein the computing a requestor risk score comprises:
for each rule among the second subset of rules, determining an event requestor risk score by subtracting a product of the weight and the confidence from a value of one; and
determining a product of the event requestor risk scores for the second subset of rules; and
determining the requestor risk score by subtracting the product from a value of one.

18. The computer readable storage medium of claim 15, wherein the computing the active invoice score comprises:
determining a first product based on a subset of the weights for a third subset of rules violated by the at least one event, the third subset of rules are associated with the invoice data;
for each rule among the third subset of rules, determining an event risk score by subtracting a product of the weight and the confidence from a value of one;
determining a second product of the difference, the vendor risk score, and the requestor risk score; and
determining the active invoice score by subtracting the second product from a value of one.

19. The computer readable storage medium of claim 15, further comprising analyzing the transaction data for text indicative of fraud.

20. The method of claim 15 further comprising a principled approach to learning performed using sequential probabilistic learning to obtain the set of weights.

* * * * *